No. 739,885. PATENTED SEPT. 29, 1903.
W. A. LEE.
HARVESTER.
APPLICATION FILED SEPT. 30, 1902.
NO MODEL. 2 SHEETS—SHEET 1.
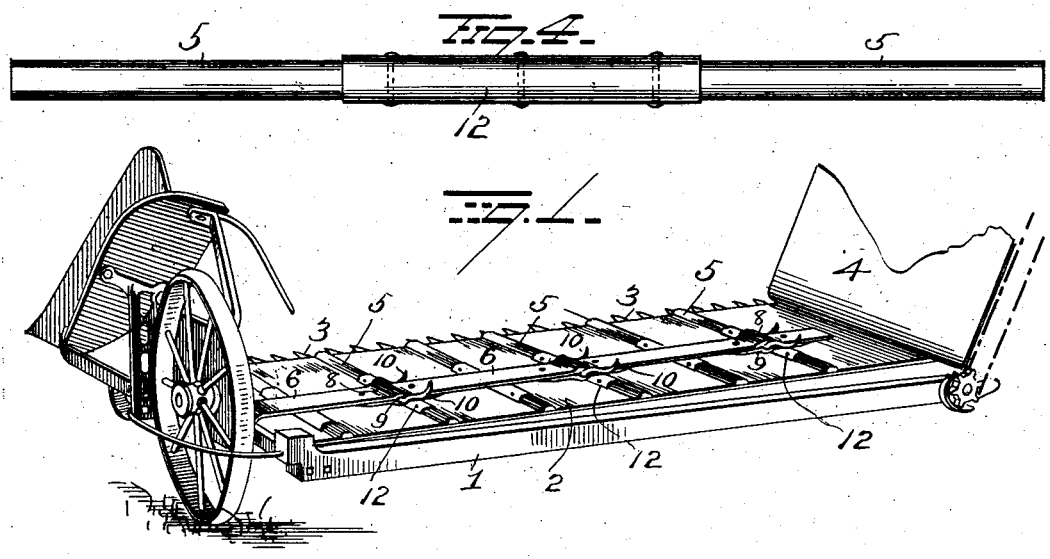
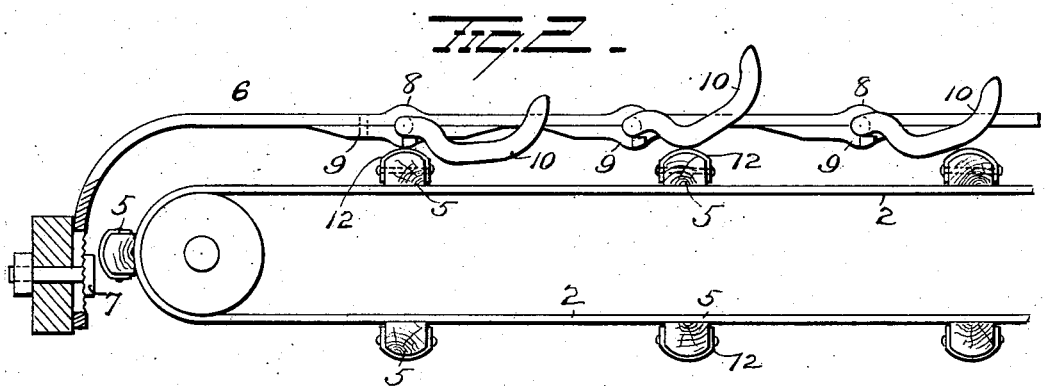
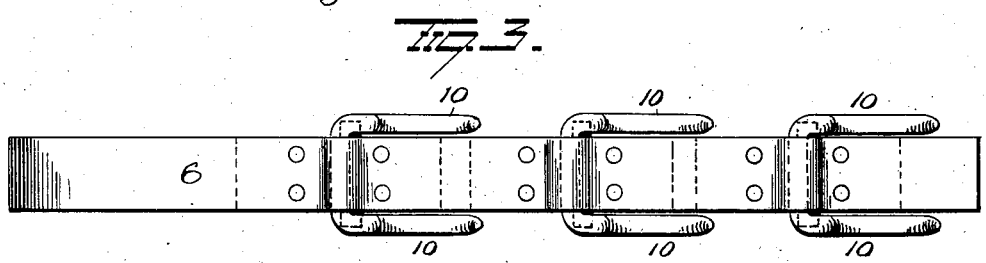
WITNESSES
INVENTOR
W. A. Lee
By H. A. Seymour
Attorney

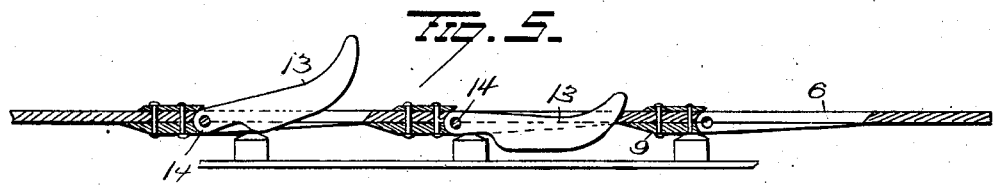
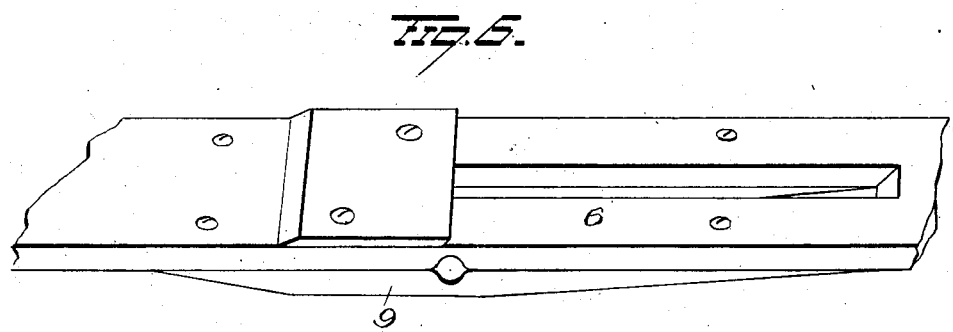
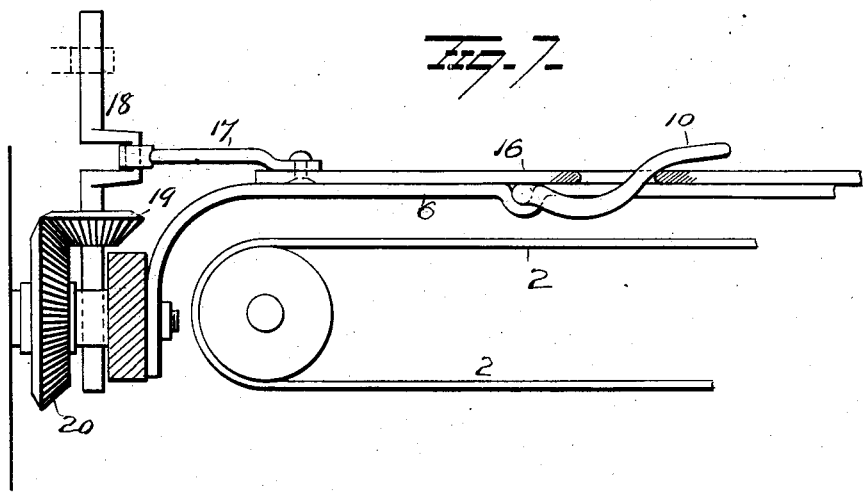

No. 739,885. Patented September 29, 1903.

UNITED STATES PATENT OFFICE.

WILLIAM ASHBURN LEE, OF BLACKWELL, OKLAHOMA TERRITORY.

HARVESTER.

SPECIFICATION forming part of Letters Patent No. 739,885, dated September 29, 1903.

Application filed September 30, 1902. Serial No. 125,400. (No model.)

*To all whom it may concern:*

Be it known that I, WILLIAM ASHBURN LEE, a resident of Blackwell, in the county of Kay and Territory of Oklahoma, have invented certain new and useful Improvements in Harvesters; and I do hereby declare the following to be a full, clear, and exact description of the invention, such as will enable others skilled in the art to which it appertains to make and use the same.

My invention relates to an improvement in harvesters, and more particularly to conveyer mechanism therefor, the object of the invention being to provide improved automatic retarding mechanism for the headed or heavier end of wheat-straw or other material deposited onto the conveyer after being cut and to compel it to move uniformly across the conveyer and not be drawn head first, which is a fault of conveyers of this character heretofore known.

With this object in view the invention consists in certain novel features of construction and combinations and arrangements of parts, as will be more fully hereinafter described, and pointed out in the claims.

In the accompanying drawings, Figure 1 is a view in perspective of a harvester-frame provided with the improvement. Fig. 2 is an enlarged view, in horizontal vertical section, of a portion of the endless apron and improved retarding devices. Fig. 3 is a plan view of the retarding devices. Fig. 4 is a plan view of one of the slats of the endless apron. Fig. 5 is a view in horizontal section of a modified construction of the retarding mechanism, and Fig. 6 is a view in perspective of a portion of the slotted bar to which the retarders are pivoted. Fig. 7 is a side view of a portion of the mechanism of another modification of the invention.

1 represents the ordinary harvester-frame supported on wheels and provided with an endless-apron conveyer 2, located behind the cutters 3, and onto which the straw or wheat falls after being cut, and is conveyed thereby to an inclined conveyer 4 for depositing the same at one side of the harvester.

In the operation of these machines, especially in harvesting wheat and the like, the grain will be unevenly presented to the inclined conveyer 4 by reason of the fact that the heads of the grain are heavier and are carried forward, drawing the straw at an incline, and to avoid this and compel the straw to move evenly my invention was devised and will now be described.

The apron 2 is provided with slats 5, extending from edge to edge thereof and secured at regular intervals, as clearly shown.
A bar 6, curved at one end to curve around one roller of the conveyer, is secured at this curved end by a set-screw and clamp 7 to the harvester-frame and extends longitudinally across the apron, the set-screw and clamp connection enabling the bar to be adjusted on the frame according to the length of the straw cut, as will be hereinafter understood. This bar 6 is provided at regular intervals with semicylindrical bearings 8, under which plates 9, having similar-shaped bearings, are secured to provide bearings for retarders 10. These retarders 10 comprise rods bent at two points between their ends at right angles and rotatably supported in the bearings, the end of the rods or retarder-fingers being disposed parallel and given the compound curve shown to provide shoulders to be engaged by slats 5, which raise the fingers into the path of the moving straw, as will now be set forth. The slats 5 are preferably composed of wood covered throughout a portion of their length where they engage the retarders with a metal covering 12, and these coverings 12 are of a sufficient length to compensate for any adjustment of bar 6.

The operation of my improvements is as follows: As the straw is cut it falls on apron 2, and the latter, moving toward the inclined conveyer 4, carries the same thereto; but owing to the heads of the straw or grain being the heavier the tendency is to move this end faster than the other. This tendency is obviated by the retarders, which by means of the slats 5 engaging shoulders 11 are periodically raised and projected into the straw at or near its headed end, thus holding back this end of the straw and compelling it to move uniformly. The retarders can be so arranged as to be operated simultaneously or alternately, according to the location of the slats with relation to the retarders.

In Figs. 5 and 6 I have illustrated a slightly-modified form of construction in which the bar 6 is slotted at regular intervals and flat retarders 13 of the same general shape as the fingers of the retarders above described are mounted in the slots and supported on short shafts 14, secured in bearings at one end thereof. The operation of this form of my invention is precisely like that heretofore described, the slats 5 engaging curved shoulders on the retarders and raising them while moving beneath them.

In Fig. 7 I have shown still another modification in which the fingers of the retarders project through slots in and are operated by a sliding bar 16, located on bar 6. This bar 16 is connected by a link 17 with a vertical crank-shaft 18, having a gear 19 thereon meshing with a gear 20 on the main drive shaft or axle of grain-wheel, so that when the machine moves over the ground the bar 16 will be reciprocated by the crank-shaft to periodically project the retarders into the straw or grain.

A great many other changes might be made in the general form and arrangement of the parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. The combination with an endless conveyer, of a bar located above the conveyer, fingers pivoted to the bar, and means for raising the fingers at intervals and causing them to project into and retard the material carried by the conveyer, substantially as set forth.

2. The combination with an endless conveyer, of an adjustable bar located above the conveyer, fingers pivoted to the bar and means for periodically raising the fingers and causing them to project into and retard the material carried by the conveyer, substantially as set forth.

3. The combination with a harvester, of an endless conveyer, pivoted fingers above the conveyer, and means for operating the fingers to periodically raise them or project them into material being carried by the conveyer.

4. The combination with an endless-apron conveyer provided with slats, of pivoted fingers located above the conveyer and adapted to be independently raised by the contact of the slats therewith, substantially as set forth.

5. The combination with a harvester and an endless-apron conveyer thereon having slats at regular intervals, of a bar adjustably secured to the harvester-frame and projecting across and above the apron, and pivoted retarding-fingers carried by the bar and operated by the slats to periodically raise them into material deposited on the apron.

6. The combination with an endless conveyer having slats thereon of a bar projecting over the apron provided with retarding-fingers and a set-screw and clamp for attaching the bar to harvester-frame.

In testimony whereof I have signed this specification in the presence of two subscribing witnesses.

WILLIAM ASHBURN LEE.

Witnesses:
E. C. LEE,
D. C. DAVISON.